United States Patent
Lin et al.

(10) Patent No.: US 8,663,449 B2
(45) Date of Patent: Mar. 4, 2014

(54) FEED CONTROL METHOD FOR WIRE CUTTING ELECTROCHEMICAL DISCHARGE MACHINING AND APPARATUS THEREOF

(75) Inventors: Jui-Kuan Lin, Taichung (TW); Hsiang-Kuo Lee, Taoyuan County (TW); Yang-Xin Lin, Taipei (TW); Hsin-Chuan Su, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/559,465

(22) Filed: Jul. 26, 2012

(65) Prior Publication Data

US 2012/0292292 A1    Nov. 22, 2012

Related U.S. Application Data

(62) Division of application No. 12/464,007, filed on May 11, 2009, now abandoned.

(30) Foreign Application Priority Data

Aug. 14, 2008  (TW) ................. 97130966 A
Mar. 12, 2009  (TW) ................. 98107987 A

(51) Int. Cl.
*B23H 3/00*  (2006.01)
*B23H 7/02*  (2006.01)
*B23H 7/08*  (2006.01)

(52) U.S. Cl.
USPC ........ 205/641; 205/651; 205/640; 204/228.1; 204/228.8

(58) Field of Classification Search
None
See application file for complete search history.

(56) References Cited

U.S. PATENT DOCUMENTS

| 4,725,706 A | 2/1988 | Inoue |
| 5,233,147 A | 8/1993 | Magara |
| 6,723,941 B2 | 4/2004 | Sato et al. |
| 2002/0170829 A1 | 11/2002 | Kim et al. |
| 2008/0156639 A1 | 7/2008 | Mai et al. |

FOREIGN PATENT DOCUMENTS

| JP | 5069231 A | 3/1993 |
| TW | 536436 | 6/2003 |
| TW | 200827072 | 7/2008 |

OTHER PUBLICATIONS

Taiwan Patent Office, Notice of Allowance, Patent Application Serial No. 098107987, Dec. 14, 2011, Taiwan.

*Primary Examiner* — Nicholas A Smith
*Assistant Examiner* — Brian W Cohen

(57) ABSTRACT

A feed control method for wire cutting electrochemical discharge machining is disclosed. The method determines whether a contact event has occurred using a wire electrode, based on variations in wire tension when being cut. A wire is cut with an ideal feed speed when the wire electrode is not in contact with a workpiece.

6 Claims, 8 Drawing Sheets

FEED CONTROL METHOD FOR WIRE CUTTING ELECTROCHEMICAL DISCHARGE MACHINING AND APPARATUS THEREOF

CROSS REFERENCE TO RELATED APPLICATIONS

This Application claims priority of Taiwan Patent Application No. 97130966, filed on 14 Aug. 2008, the entirety of which is incorporated by reference herein.

This Application claims priority of Taiwan Patent Application No. 98107987, filed on 12 Mar. 2009, the entirety of which is incorporated by reference herein.

The present application is a divisional of and claims priority from U.S. patent application Ser. No. 12/464,007, filed 11 May 2009, the content of which is hereby incorporated by reference in its entirety.

BACKGROUND OF THE INVENTION

1. Field of the Invention

The invention relates to electrochemical discharge machining, and more particularly to a feed control method for wire cutting electrochemical discharge machining and an apparatus thereof.

2. Description of the Related Art

Nonconductive brittle materials are widely used in microelectro mechanical systems (MEMS) or biochips due their heat-resistant, deformation-resistant, and corrosion-resistant characters. However, if nonconductive brittle materials are processed using traditional machining methods, material removal rate may suddenly increase, such that machining precision is negatively influenced or the state of the machining operation may be uncontrollable due to fractured material surfaces. Thus, providing machining methods with high process feed speed and high precision is desired.

Generally, wire cutting and electrochemical discharge machining is not affected by strength and hardness of materials, so cutting of wires and machining with complicated paths and loci can be provided. For such a case, machining can be implemented using wire electrical discharge machining (WEDM) only if processed materials are conductible. However, nonconductive brittle materials cannot be processed using conventional wire electrical discharge machining methods. As such, combination of a wire electrical discharge machining method and an electrochemical discharge machining method has been disclosed.

Conventional electrochemical discharge machining methods at least comprise a weight weighting and feed method and a constant-speed feed machining method.

FIG. 1 is a schematic view of a weight weighting and feed method.

The weight weighting and feed method comprises a weight 110, being hung on an external process trough 120, so that gravity of the weight is imposed on an internal process trough 140 using the external process trough 120 and a slide rail mechanism 130, resulting in an automated feed operation. The automated feed forces a workpiece to carry a wire electrode for machining, such that there is no gap between the workpiece, in any position, and the wire electrode, which is a contact process. However, a rough workpiece surface may occur, since processes for only a portion of the contact workpiece is completed as un-processed workpieces are ignored to eliminate discharging by eliminating bubble generated at the contact point of the wire electrode and the processed workpiece. As described, drawbacks of the weight weighting and feed method comprise the rough surface and a slow process feed speed.

The constant-speed feed machining method allows a wire electrode or workpiece to be moved with a constant speed (a slower process feed speed) for machining. When the process feed speed is greater than an initial feed speed, the wire electrode does not contact with the workpiece so that a smooth surface can be obtained. Theoretically, if an optimum process feed speed can be provided, a smooth surface and a faster process feed speed can be obtained, but long-term monitoring and management are required. The process feed speed must be reduced once a contact event occurs, or a contact process will start to generate a rough surface and slow down the process feed speed, which might break the wire electrode. Thus, the constant-speed feed machining method is not appropriate to be used for automated machining.

Thus, a feed control method for wire cutting electrochemical discharge machining and an apparatus thereof are desirable. The method should improve the feed speed and prevent the wire electrode from contacting with the workpiece during machining, thereby achieving automated and complex machining and enhancing machining efficiency and precision.

BRIEF SUMMARY OF THE INVENTION

Feed control methods for wire cutting electrochemical discharge machining are provided. An exemplary embodiment of a feed control method for wire cutting electrochemical discharge machining comprises the following. A machining operation is performed that makes a first speed of a servo feed of a workpiece identical to a predetermined initial velocity. A timer is set and activated to calculate the amount of time the workpiece is in contact with a wire electrode. An input value is read. It is determined whether the wire electrode is in contact with the workpiece. A separation operation is performed to separate the wire electrode from the workpiece by a predetermined distance if the wire electrode is in contact with the workpiece. The first speed of a servo feed of the workpiece is made to be identical to a second speed of a servo feed. It is determined whether the amount of time of the timer has reached a predetermined non-contact time amount if the wire electrode is not in contact with the workpiece. The workpiece is instructed to proceed with the machining operation with the first speed of a servo feed if the time has not reached the predetermined non-contact time amount. If the time amount reaches the predetermined non-contact time amount, the first speed of a servo feed is made to be identical to the third speed of a servo feed to proceed with the machining operation.

Another embodiment of a feed control method for wire cutting electrochemical discharge machining comprises the following. A machining operation is performed so that an initial input value of a workpiece is set and makes a first speed of a servo feed of the workpiece identical to a predetermined initial velocity. A timer is set and activated to calculate the amount of time the workpiece is in contact with a wire electrode. A first input value is read. Noise is removed from the first input value to generate a second input value. It is determined whether the second input value is greater than the sum of the initial input value and a boundary value. A separation operation is performed to separate the wire electrode from the workpiece by a predetermined distance if the second input value is greater than the sum of the input tension value and the boundary value. The first speed of a servo feed is made to be identical to a second speed of a servo feed to proceed with the machining operation. It is determined whether the amount of time of the timer has reached a predetermined non-contact time amount if the second input value is not greater than the sum of the initial input value and the boundary value. The workpiece is instructed to proceed with the machining operation with the first speed of a servo feed if the time has not reached the predetermined non-contact time amount. If the time amount reaches the predetermined non-contact time amount, the first speed of a servo feed is made to be identical to a third speed of a servo feed to proceed with the machining operation.

Apparatuses of feed control for wire cutting electrochemical discharge machining are provided. An exemplary embodiment of an apparatus of feed control for wire cutting electrochemical discharge machining comprises a wire speed control mechanism, a wire tension control mechanism, a wire electrode, a wire tensiometer, a workpiece, and a controller. The wire electrode is installed along the wire speed control mechanism and the wire tension control mechanism. The wire tensiometer is installed between the wire speed control mechanism and the wire tension control mechanism for retrieving a wire tension value from the wire electrode. The controller makes a first speed of a servo feed of a workpiece identical to a predetermined initial velocity and reads the wire tension value, determines whether the wire electrode is in contact with the workpiece, performs a separation operation to separate the wire electrode from the workpiece by a predetermined distance if the wire electrode is in contact with the workpiece, progressively decreases the first speed of a servo feed of the workpiece by a predetermined decremental value to generate a second speed of a servo feed of the workpiece and makes the first speed of a servo feed identical to the second speed of a servo feed, determines whether the amount of time of a timer has reached a predetermined non-contact time amount if the wire electrode is not in contact with the workpiece, instructs the workpiece to proceed with the machining operation with the first speed of a servo feed if the time has not reached the predetermined non-contact time amount, and progressively increases the first speed of a servo feed of the workpiece by a predetermined incremental value to generate a third speed of a servo feed of the workpiece, if the time amount reaches the predetermined non-contact time amount, and makes the first speed of a servo feed identical to the third speed of a servo feed to proceed with the machining operation.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
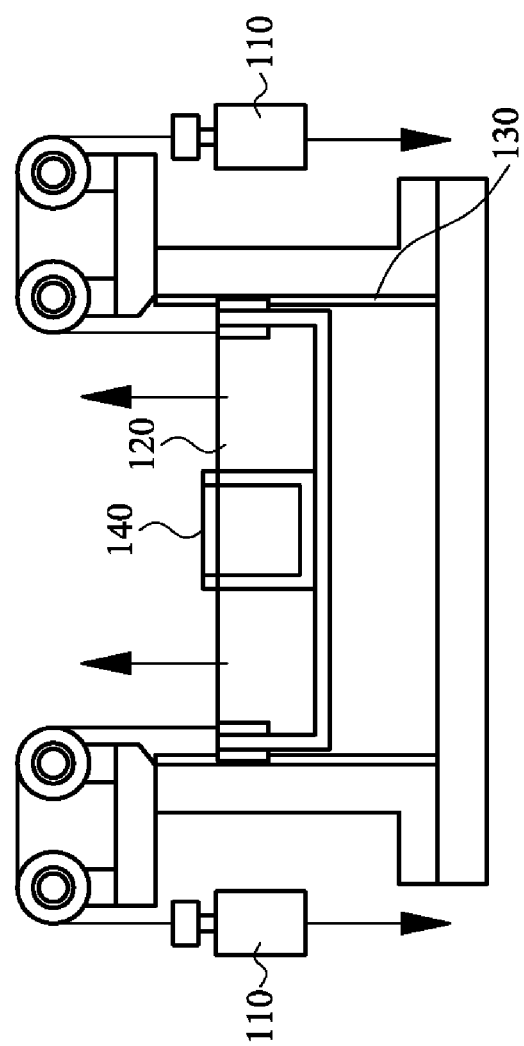
FIG. 1 is a schematic view of a weight weighting and feed method.

Several exemplary embodiments of the invention are described with reference to FIGS. 2 through 6, which generally relate to feed control for wire cutting electrochemical discharge machining. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a feed control method for wire cutting electrochemical discharge machining and an apparatus thereof.

An embodiment of a feed control method for wire cutting electrochemical discharge machining allows a wire electrode to nearly approach a workpiece so that the wire electrode can be insulated with intact bubbles that are generated. Next, high voltage is applied to the bubbles for discharging so that wire cutting and electrochemical discharge machining can be operated and automatically control feed speed during operation, so that machining efficiency can be enhanced and acceptable roughness and higher precision can be obtained.

Figure 2:
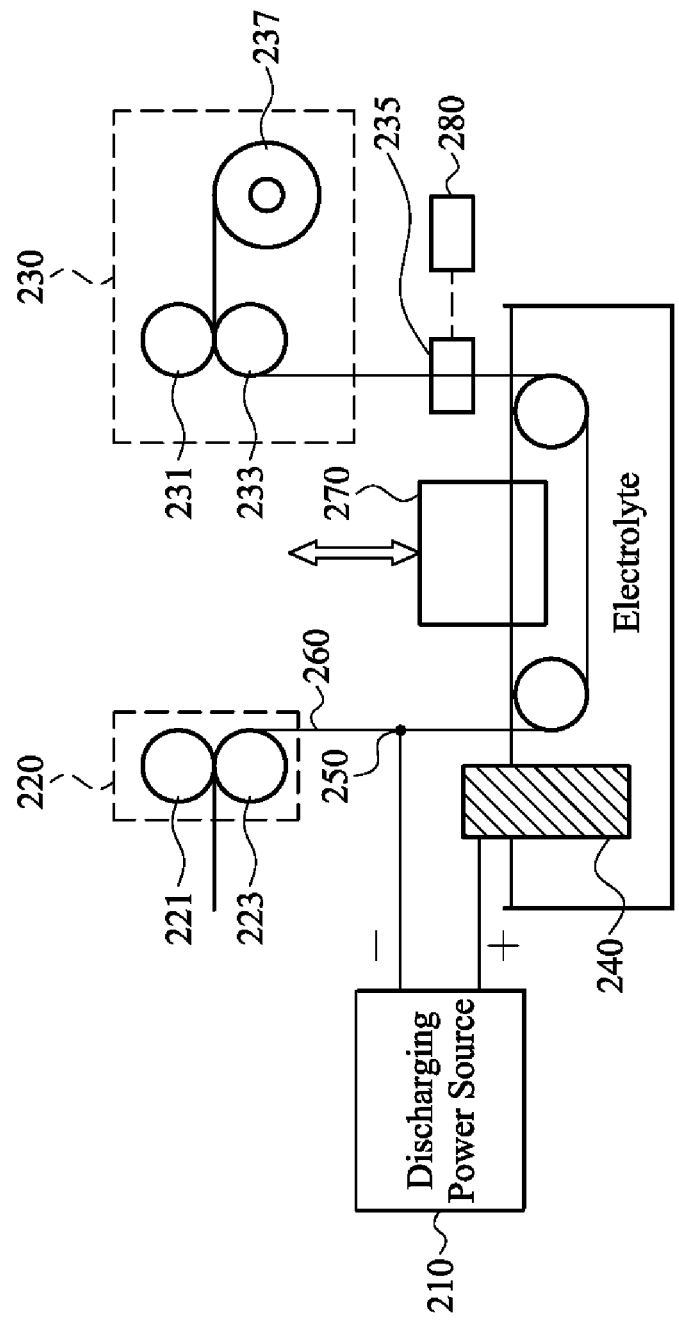
FIG. 2 is a schematic view of an apparatus of feed control for wire cutting electrochemical discharge machining of the present invention.

FIG. 2 is a schematic view of an apparatus of feed control for wire cutting electrochemical discharge machining of the present invention. The apparatus comprises a discharging power source 210, a wire speed control mechanism 220, a wire tension control mechanism 230, a wire tensiometer 235, an assistant electrode 240, a wire conduction device 250, a wire electrode 260 installed along the wire speed control mechanism 220 and the wire tension control mechanism 230, and a workpiece 270 dipped in electrolyte and processed using the wire electrode 260, and a controller 280. The wire speed control mechanism 220 further comprises a creaser wheel 221 and a wire speed control wheel 223. The wire tension control mechanism 230 further comprises a creaser wheel 231, a wire speed control wheel 233, and a bobbin 237. The controller 280 makes a speed of a servo feed of the workpiece 270 identical to a predetermined initial velocity, reads an input value (for example, a wire tension value or a determination signal) from the wire tensiometer 235 to determine whether the wire electrode 260 is in contact with the workpiece 270, and controls a servo control feed speed and direction of the workpiece 270 using a control method. The double arrow in the figure represents the servo control feed direction of the workpiece 270.

Figure 3A:
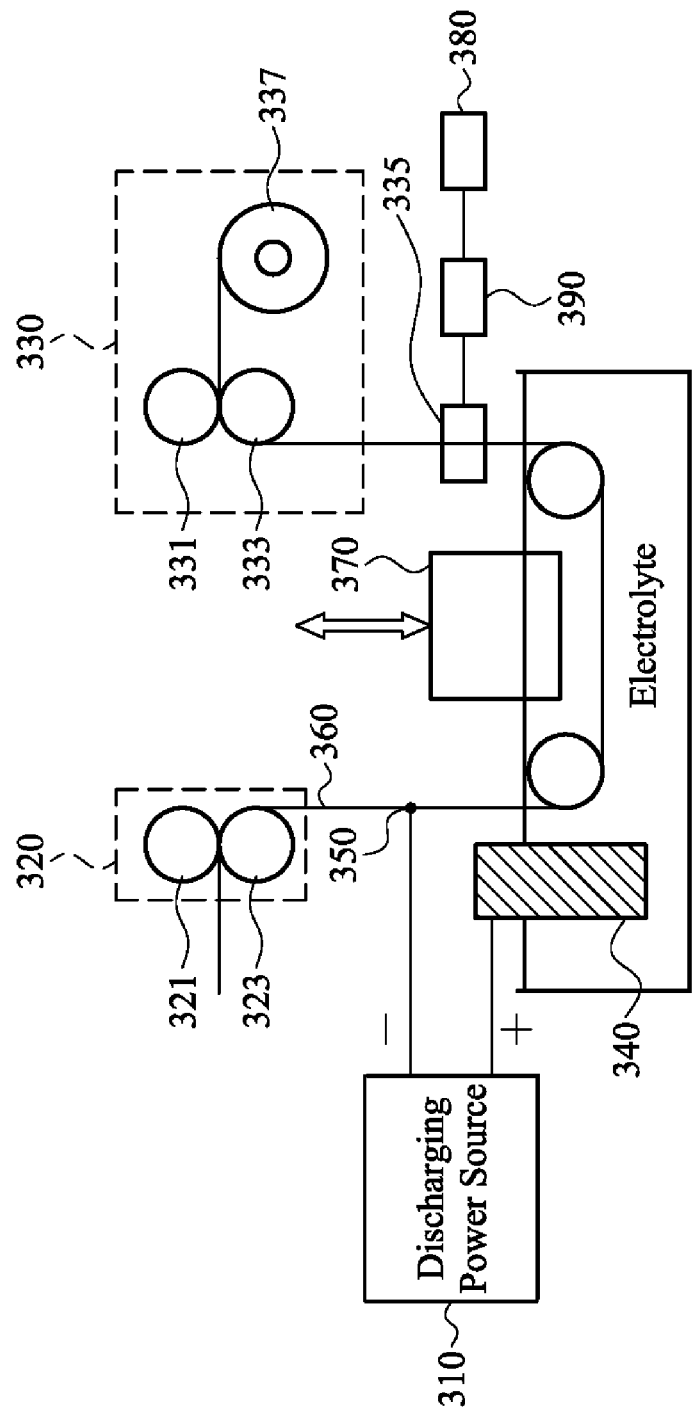
FIG. 3A is a schematic view of another embodiment of an apparatus of feed control for wire cutting electrochemical discharge machining using a wire contact and determination circuit of the present invention.

FIG. 3A is a schematic view of another embodiment of an apparatus of feed control for wire cutting electrochemical discharge machining using a wire contact and determination circuit of the present invention. The apparatus comprises a discharging power source 310, a wire speed control mechanism 320, a wire tension control mechanism 330, a wire tensiometer 335, an assistant electrode 340, a wire conduction device 350, a wire electrode 360 installed along the wire speed control mechanism 320 and the wire tension control mechanism 330, and a workpiece 370 located in electrolyte and processed using the wire electrode 360, a controller 380, and a wire contact and determination circuit 390. The wire contact and determination circuit 390 is electrically connected and installed between the controller 380 and the wire tensiometer 335 to determine whether the wire electrode 360 is in contact with the workpiece 370.

Figure 3B:
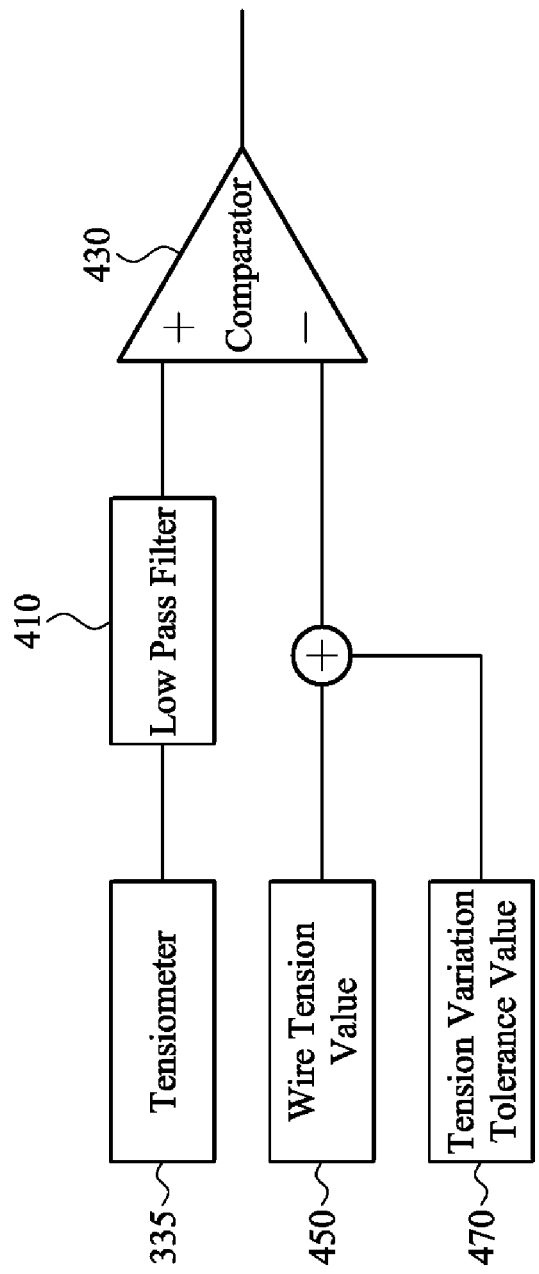
FIG. 3B is a schematic view of the wire contact and determination circuit of the present invention.
Figure 6:
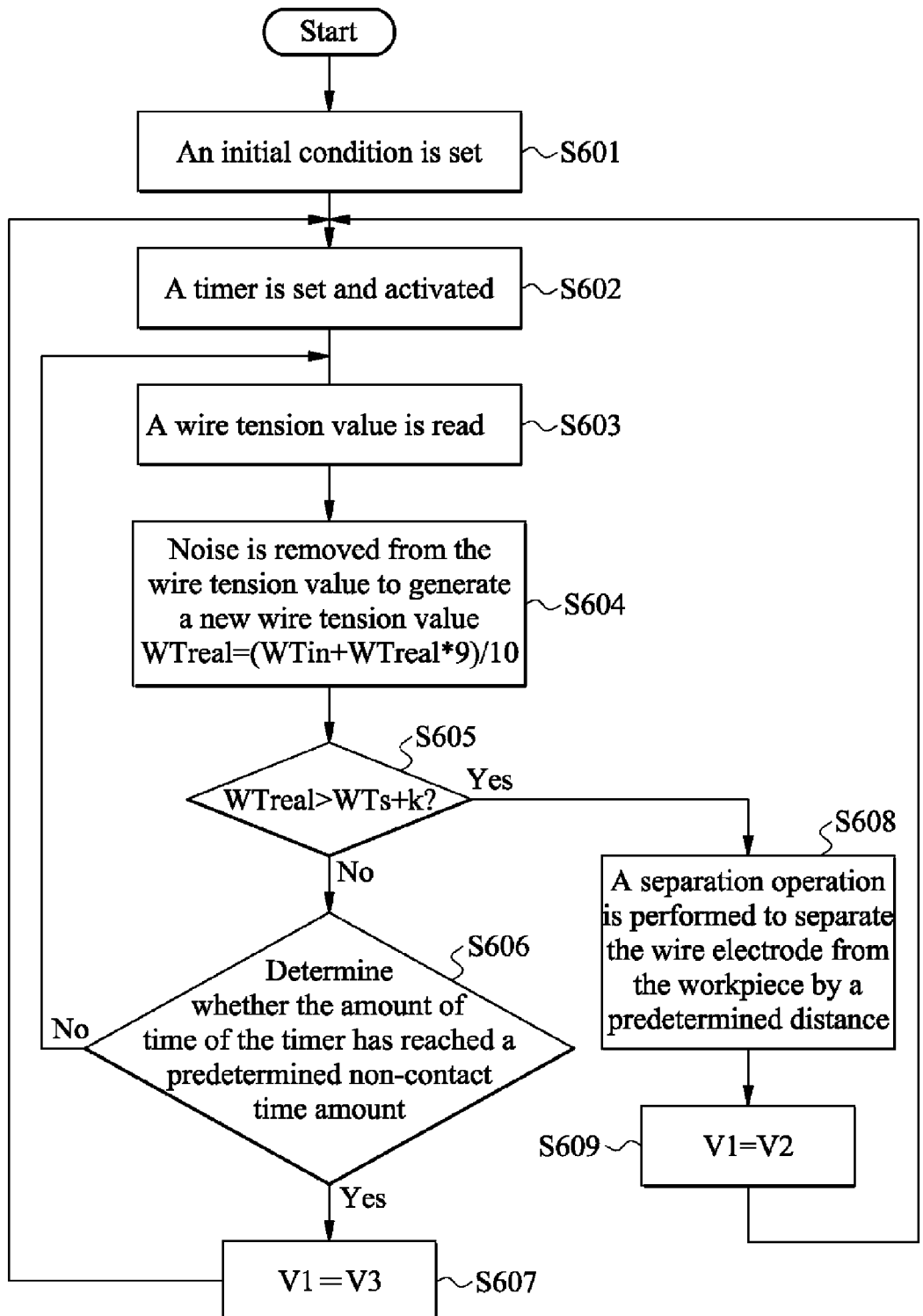
FIG. 6 is a flowchart of a servo control process for speeding up and slowing down the acceleration using the wire tensiometer of the present invention.

FIG. 3B is a schematic view of the wire contact and determination circuit of the present invention. As shown in FIG. 3B, the wire contact and determination circuit 390 can be implemented using hardware circuits, comprising a low pass filter 410 and a comparator 430. The wire contact and determination circuit 390 retrieves an input value (for example, a wire tension value or a determination signal) 450 from the wire tensiometer 450, removes high frequency noise from the input value, and transmits the input value to the comparator 430. Next, the wire contact and determination circuit 390 generates a comparison signal according to a input value and a tension variation tolerance value 470 and the comparator 430 determines whether a contact event is generated according to the tension variation tolerance value. The wire contact and determination circuit 390 can be implemented by software or hardware. Thus, the wire contact and determination circuit 390 may not be a physical hardware circuit but can be represented by program codes stored in a storage unit (not shown). Referring to FIG. 6, the wire contact and determination circuit 390 shown in FIG. 3 can be replaced by software implementation.

Figure 4:
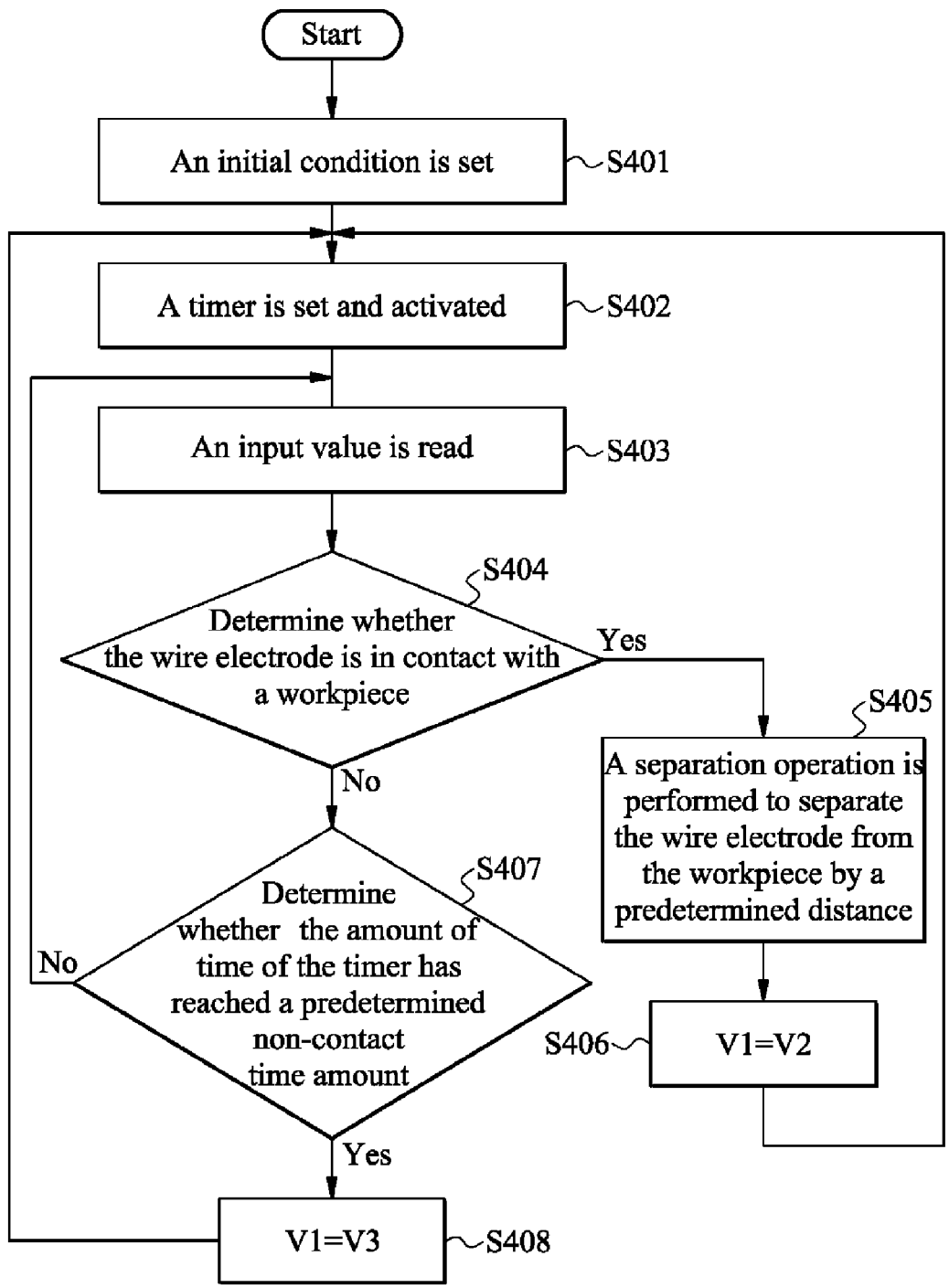
FIG. 4 is a flowchart of a control method for speeding up and slowing down the acceleration of the present invention.

FIG. 4 is a flowchart of a control method for speeding up and slowing down the acceleration of the present invention.

An initial condition is set, making a speed of a servo feed (V) of a workpiece to be identical to a predetermined initial velocity (step S401). A timer is set and activated to calculate the amount of time the workpiece is in contact with a wire electrode (step S402). An input value (for example, a wire tension value or a determination signal) is read (step S403) and it is determined whether the wire electrode is in contact with the workpiece (step S404). If the wire electrode is in contact with the workpiece, which indicates that the speed of a servo feed of the workpiece is too fast, a separation operation is performed to separate the wire electrode from the workpiece by a predetermined distance (step S405). Next, a second speed of a servo feed of the workpiece is generated using a control method to replace the current speed of a servo feed (i.e. V1=V2) (step S406) to progressively approach the speed of a servo feed to an optimum speed and the process proceeds to step S402 to repeat the described steps. The control method of this embodiment comprises generating the second speed of a servo feed using a preset increment value (i.e. V2=V1−m and then V1=V2). The control method further comprises a lookup table, Proportional-Integral-Derivative (PID), adaptive control, neural control, or fuzzy control.

If the wire electrode is not in contact with the workpiece, it is determined whether the amount of time of the timer has reached a predetermined non-contact time amount (60 seconds, for example), indicating a preset time required for the workpiece contacting the wire electrode (step S407). If the time has not reached the predetermined non-contact time amount, the original speed of a servo feed of the workpiece is maintained and the process proceeds to step S403 for reading of another input value (for example, a wire tension value or a determination signal). If the time amount reaches the predetermined non-contact time amount, the speed of a servo feed of the workpiece may not reach an upper limit value, so a third speed of a servo feed is generated using the control method to replace the current speed of a servo feed (i.e. V1=V3) (step S408) and the process proceeds to step S402. The control method of this embodiment comprises generating the third speed of a servo feed using a preset increment value (i.e. V3=V1+n and then V1=V3). The control method further comprises a lookup table, Proportional-Integral-Derivative (PID), adaptive control, neural control, or fuzzy control.

Figure 5A:
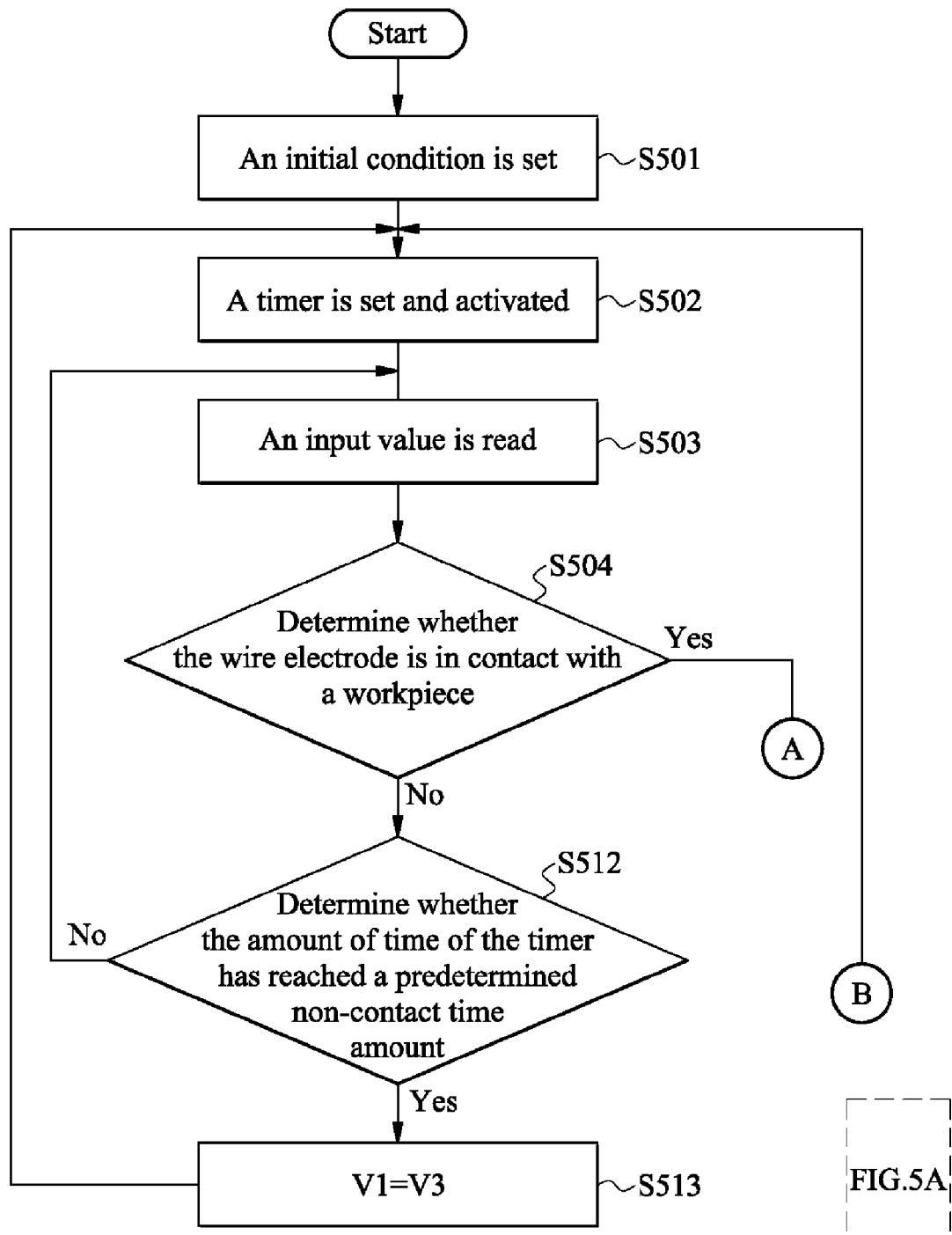
FIGS. 5A and 5B are flowcharts of a servo control process for accelerating and approaching an optimum speed using a control method of the present invention.
Figure 5B:
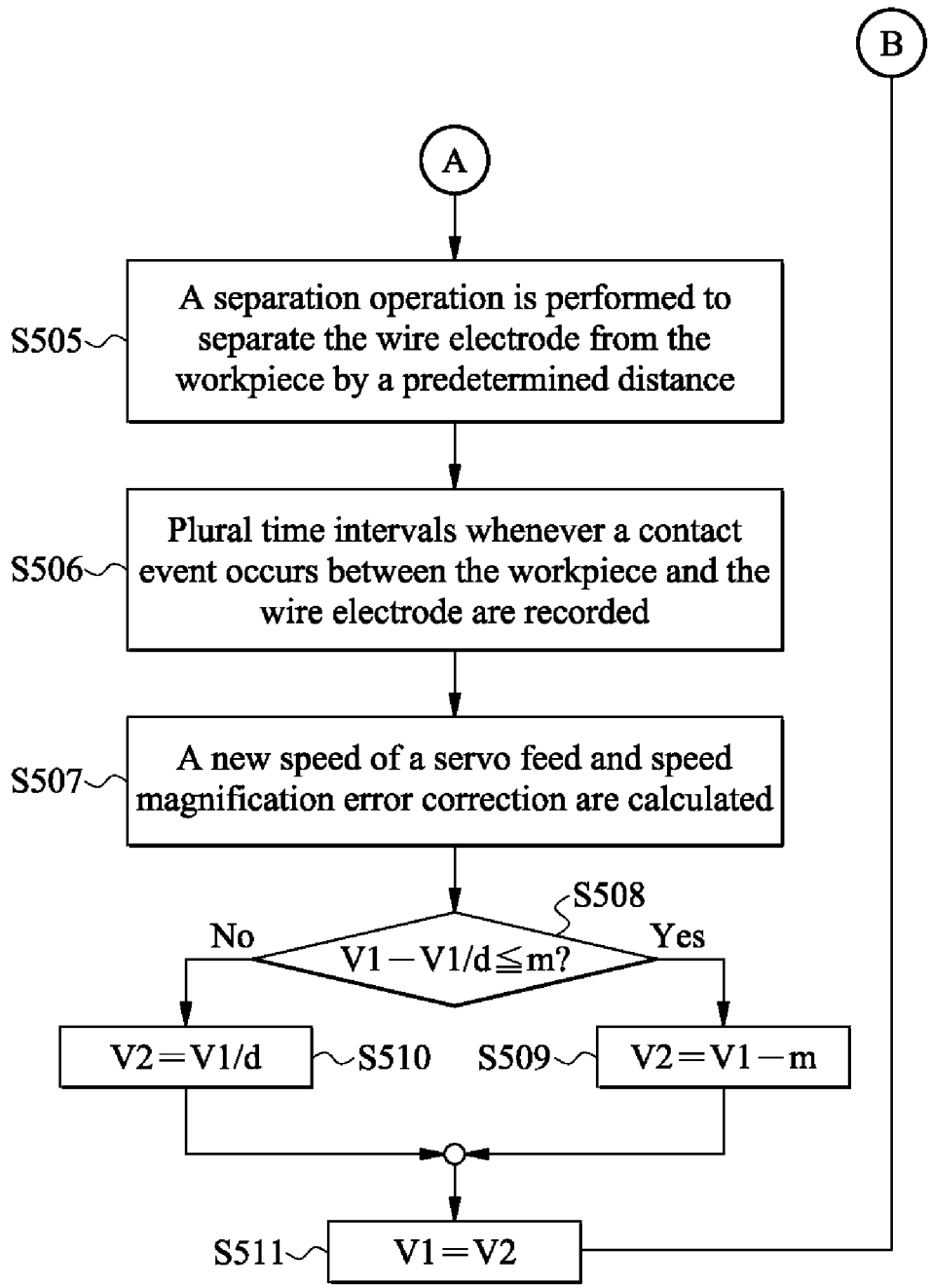

FIGS. 5A and 5B are flowcharts of a servo control process for accelerating and approaching an optimum speed using a control method of the present invention.

An initial condition is set that makes a speed of a servo feed (V) of a workpiece identical to a predetermined initial velocity (step S501). A timer is set and activated to calculate the amount of time the workpiece is in contact with a wire electrode (step S502). An input value (for example, a wire tension value or a determination signal) is read (step S503) and it is determined whether the wire electrode is in contact with the workpiece (step S504). If the wire electrode is in contact with the workpiece, which indicating that the speed of a servo feed of the workpiece is too fast, a separation operation is performed to separate the wire electrode from the workpiece by a predetermined distance (step S505).

The wire electrode contacting the workpiece indicates that the speed of a servo feed of the workpiece is too fast. Plural time intervals whenever a contact event occurs between the workpiece, in any position, and the wire electrode, are recorded to so that the speed of a servo feed may reach the optimum speed (step S506), calculating a second speed of a servo feed to replace the current speed of a servo feed (i.e. V1=V2). Alternatively, a third speed of a servo feed is calculated by calculating deceleration and acceleration events to replace the current speed of a servo feed (i.e. V1=V3) (step S507).

Suppose the time for generating a contact event is less than 60 seconds, for example. Thus, an attenuation Formula is obtained, as follows:

Attenuation Magnification($d$)=60 ($sec$)/time interval of contact event ($t$)　　(1).

Thus, an attenuation magnification table can be created by 10 seconds per unit, as shown in Table 1.

TABLE 1

| | Time Interval (t) | | | | | | |
|---|---|---|---|---|---|---|---|
| | 10 | 20 | 30 | 40 | 50 | 60 | >60 |
| Attenuation Magnification (d) | 6 | 3 | 2 | 1.5 | 1.2 | 1 | 1 |

Another Formula can be obtained according to attenuation magnifications in Table 1, as follows:

New speed of a servo feed $V=V$/Attenuation Magnification ($d$)　　(2).

Thus, when the non-contact time amount interval is less than 10 seconds, V=V/6, when the non-contact time amount interval is between 10-20 seconds, V=V/3, and so forth. It is determined whether correction (V1−V1/d) of the speed of a servo feed of the workpiece is less than or equal to a predetermined least correction speed (step S508). When the attenuation magnification is so small that correction is less than the predetermined least correction speed, the speed correction formula (V2=V1−m) is applied (step S509). If the correction is greater than the predetermined least correction speed, the speed correction formula (V2=V1/d) is applied (step S510), thereby obtaining a new speed of a servo feed (V1=V2) (step S511).

The attenuation magnification table can be created by experimentation or other control methods such as Fuzzy, Proportional Integral Derivative (PID), and the like.

If the wire electrode is not in contact with the workpiece, it is determined whether the amount of time of the timer has reached a predetermined non-contact time amount, which is the time that the workpiece should be in contact with the wire electrode (step S512). If the he time of the timer has not reached the predetermined non-contact time amount, the original speed of a servo feed of the workpiece is maintained and the process proceeds to step S503 for reading of another input value (for example, a wire tension value or a determination signal). If the time amount reaches the predetermined non-contact time amount, the speed of a servo feed of the workpiece may not reach an upper limit value, so a third speed of a servo feed is generated to replace the current speed of a servo feed (i.e. V1=V3) (step S513 and the process proceeds to step S502. The control method of this embodiment comprises generating the third speed of a servo feed using a preset increment value (i.e. V3=V1+n and then V1=V3). The control method further comprises a lookup table, Proportional-Integral-Derivative (PID), adaptive control, neural control, or fuzzy control.

FIG. 6 is a flowchart of a servo control process for speeding up and slowing down the acceleration using a wire tensiometer of the present invention.

Initial conditions are set that defines an initial input vale (for example, a wire tension value (WTs) or a determination signal) and makes a speed of a servo feed (V) of a workpiece identical to a predetermined initial velocity (step S601). A timer is set and activated to calculate the amount of time the workpiece is in contact with a wire electrode (60 seconds, for example) (step S602). An input value (for example, a wire tension value (WTin) or a determination signal) is read (step S603) and noise is removed from the input value to generate another input value (for example, a wire tension value (WTreal) or a determination signal), where WTreal=(WTin+WTreal×9)/10 (step S604). The noise can also be removed from the input value using a statistical method. Note that the Formula WTreal=(WTin+WTreal×9)/10 is only an example but is not to be limitative.

It is determined whether the new input value is greater than the sum of the initial input value and a boundary value (K) (step S605), determining whether the wire electrode is in contact with the workpiece. If the second input value is not greater than the sum of the initial input value and the boundary value when the wire electrode is not in contact with the workpiece, it is determined whether the amount of time of the timer has reached a predetermined non-contact time amount (60 seconds, for example) (step S606). If the time has not reached the predetermined non-contact time amount, the workpiece is instructed to proceed with the machining operation with the original speed of a servo feed and the process proceeds to step S603 for reading of another input value. If the time amount reaches the predetermined non-contact time amount, the speed of a servo feed of the workpiece may not reach an upper limit value, so a second speed of a servo feed is generated using a control method to replace the current speed of a servo feed (i.e. V1=V3) (step S607) and the process proceeds to step S602.

If the input value is greater than the sum of the initial input value and the boundary value when that the wire electrode is in contact with the workpiece, it indicates that the speed of a servo feed of the workpiece is too fast. At this time, a separation operation is performed to separate the wire electrode from the workpiece by a predetermined distance (step S608), and a third speed of a servo feed of the workpiece is generated using the control method to replace the current speed of a servo feed (i.e. V1=V2) (step S609) so that the speed of a servo feed progressively approaches an optimum speed, and the process proceeds to step S602 to repeat the described steps.

Note that the embodiment of the control method generates the second speed of a servo feed and the third speed of a servo feed are generated using a control method. The control method comprises a preset increment value, a preset decrement value, a lookup table, Proportional-Integral-Derivative (PID), adaptive control, neural control, or fuzzy control.

Note that noise of the wire tension value is removed using a low pass filter implemented by hardware or a digital low pass filter implemented by software.

Note that the method and apparatus processes the wire tension value by filtering using an external hardware circuit and generates the determination signal using a comparator.

If repeatedly generated contact events are not desired because they may ruin the surface of the workpiece, the final decreased speed is served as the optimum speed and the acceleration is not further performed. Alternatively, the timer can be reset and the acceleration can be further performed once after a long time period has passed, thus, efficiently managing the acceleration and machining quality.

An embodiment of a feed control method for wire cutting electrochemical discharge machining and an apparatus thereof can automatically obtain an optimum acceleration and avoid contact machine from making the surface of a workpiece become rough when implementing automated machining. Occurrence of a contact event is determined based on tension variations of the wire electrode when machining the workpiece. When the contact event occurs, a separation operation is performed to separate the wire electrode from the workpiece and then the machining is performed again. Deceleration is automatically performed when the separation operation is complete, thus making the speed of a servo feed of the workpiece approach an optimum speed. If the machining is performed with an initial speed and a contact event does not occur over a time interval, a predetermined speed is added to the initial speed by time intervals. Next, when a contact event occurs, the acceleration is stopped and a deceleration process is performed, so that the optimum machining speed can be automatically calculated with acceptable roughness of the workpiece.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A feed control method for wire cutting electrochemical discharge machining, comprising:
   defining an initial wire tension value before a machining operation;
   performing the machining operation that sets a speed of a servo feed of a workpiece to a first speed;
   making and activating a timer to calculate the amount of time during the workpiece is not in contact with a wire electrode;
   reading a wire tension value of the wire electrode;
   generating a new wire tension value by filtering the wire tension value;
   determining whether the wire electrode is in contact with the workpiece by determining whether the new wire tension value is greater than a sum of the initial wire tension value and a boundary value, wherein the new wire tension value is greater than the sum of the initial wire tension value and the boundary value when the wire electrode is in contact with the workpiece;
   performing a separation operation to separate the wire electrode from the workpiece by a predetermined distance if the wire electrode is in contact with the workpiece;
   calculating a second speed lower than the first speed of the servo feed after the separation operation is finished;
   setting the speed of the servo feed to the second speed after the second speed is calculated;
   determining whether the amount of time of the timer has reached a predetermined non-contact time amount if the wire electrode is not in contact with the workpiece;
   instructing the workpiece to proceed with the machining operation with the first speed of the servo feed if the time has not reached the predetermined non-contact time amount;
   calculating a third speed higher than the first speed of the servo feed after the time amount reaches the predetermined non-contact time amount; and
   setting the speed of the servo feed to the third speed after the third speed is calculated.

2. The feed control method for wire cutting electrochemical discharge machining as claimed in claim 1, wherein the second speed and the third speed are generated using a control method.

3. The feed control method for wire cutting electrochemical discharge machining as claimed in claim 2, wherein the control method comprises a preset increment value, a preset decrement value, a lookup table, Proportional-Integral-Derivative (PID), adaptive control, neural control, or fuzzy control.

4. The feed control method for wire cutting electrochemical discharge machining as claimed in claim 2, wherein the control method generating the second speed further comprises:
   recording plural time intervals whenever a contact event occurs between the workpiece, in any position, and the wire electrode;
   calculating a attenuation magnification according to the time intervals;
   setting the second speed to a first value calculated by subtracting a predetermined least correction speed from the first speed of the servo feed when a second value calculated by subtracting a third value, calculated by dividing the first speed of the servo feed by the attenuation magnification, from the first speed of the servo feed is less than the predetermined least correction speed; and
   setting the second speed to the third value calculated by dividing the first speed of the servo feed by the attenuation magnification when the second value calculated by subtracting the third value, calculated by dividing the first speed of the servo feed by the attenuation magnification, from the first speed of the servo feed is not less than the predetermined least correction speed.

5. The feed control method for wire cutting electrochemical discharge machining as claimed in claim 1, wherein noise of the wire tension value is removed using a low pass filter implemented by hardware or a digital low pass filter implemented by software.

6. The feed control method for wire cutting electrochemical discharge machining as claimed in claim 1, wherein the wire tension value is processed by filtering using an external hardware circuit and the determination signal is generated using a comparator.

* * * * *